Figure 1:
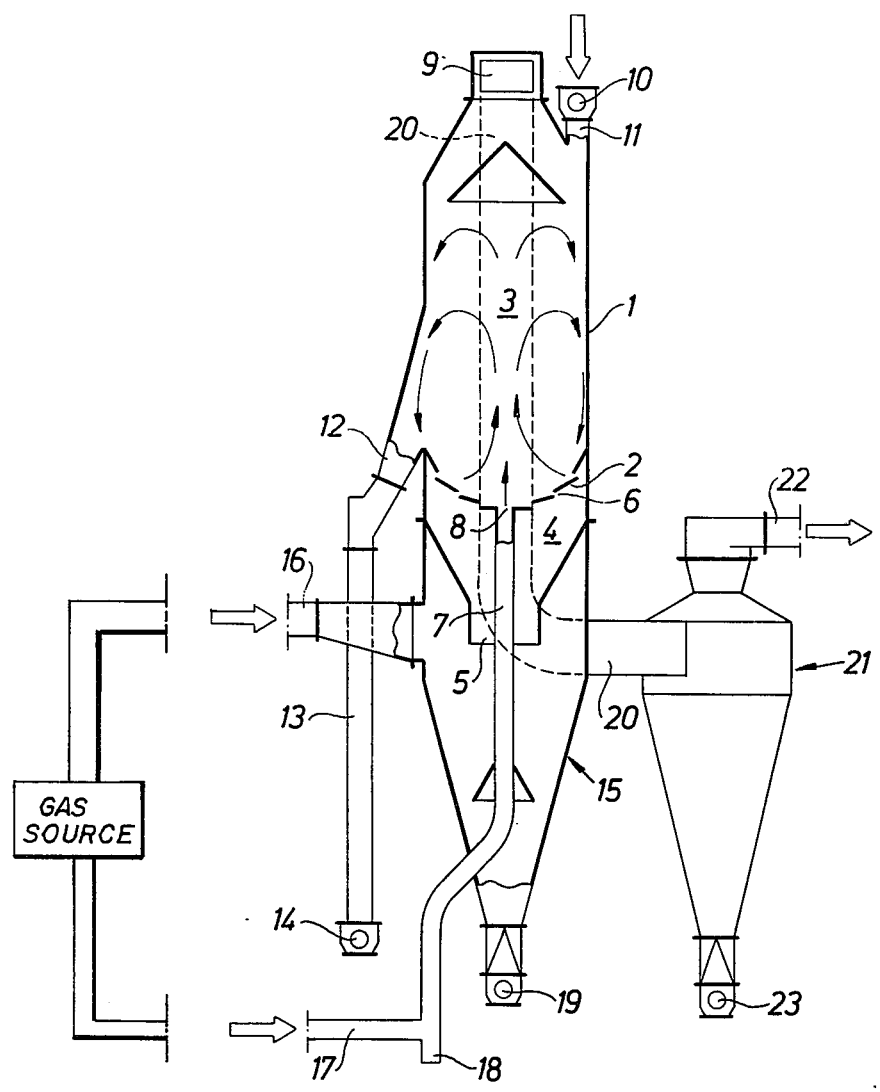

United States Patent [19]

Ferm

[11] 4,076,509
[45] Feb. 28, 1978

[54] APPARATUS FOR PROCESSING DUST-CARRYING GAS AND BULK GOODS

[75] Inventor: Bo Christer Ferm, Enkoping, Sweden

[73] Assignee: AB Bahco Ventilation, Enkoping, Sweden

[21] Appl. No.: 688,151

[22] Filed: May 20, 1976

[30] Foreign Application Priority Data

Jun. 2, 1975 Sweden .................. 75062828

[51] Int. Cl.² ............................................ B01D 50/00
[52] U.S. Cl. ......................................... 55/320; 34/10; 34/57 A; 55/337; 55/419; 55/459 R; 55/479
[58] Field of Search ................... 209/144, 138, 139 R; 55/474–476, 479, 320, 337, 419, 338–340, 459 R; 34/10, 57 A, 57 R; 23/288 S, 277 R; 75/9, 26

[56] References Cited

U.S. PATENT DOCUMENTS

| | | | |
|---|---|---|---|
| 1,719,119 | 7/1929 | McKain | 209/144 |
| 2,870,001 | 1/1959 | Giusti | 209/138 |
| 2,906,608 | 9/1959 | Jequier et al. | 75/9 |
| 3,594,991 | 7/1971 | Berz et al. | 55/337 |

FOREIGN PATENT DOCUMENTS 226,042  4/1969  Sweden.

*Primary Examiner*—Bernard Nozick
*Attorney, Agent, or Firm*—Christel & Bean

[57] ABSTRACT

Apparatus for intermingling dust-carrying gas and bulk goods for treating either one, e.g. drying the bulk goods or scrubbing the gas, in a bed of the bulk goods aerated by the gas. The apparatus comprises a grating with through-flow openings for a first partial stream of the gas which are so directed that this first partial stream flows substantially horizontally from the outside and inwardly towards the middle of the bed and another gas inlet in the middle of the grating for introducing a second partial stream of the gas from below and upwardly in the bed. A dust separator is arranged for scrubbing the first partial stream before it is supplied to the through-flow openings of the grating. The other gas inlet is connected so that the second partial stream is supplied to the grating more rich in dust than the first partial stream.

5 Claims, 2 Drawing Figures

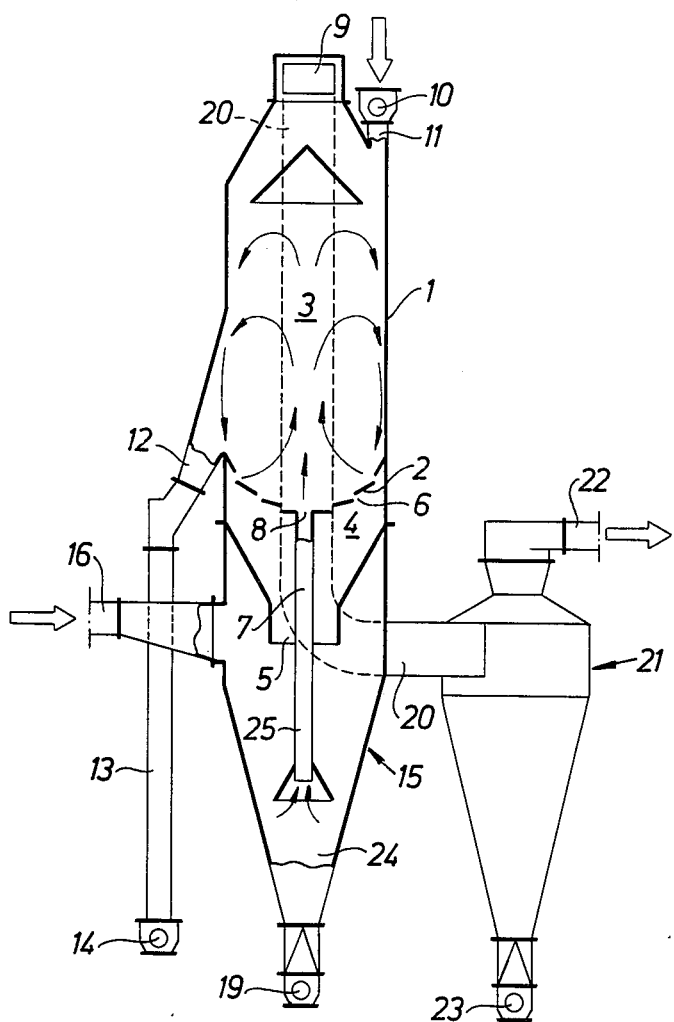

APPARATUS FOR PROCESSING DUST-CARRYING GAS AND BULK GOODS

The invention relates to an apparatus adapted for intermingling dust-carrying gas and aeratable bulk goods for processing either one of them, e.g. drying the bulk goods or scrubbing the gas, in a bed of the bulk goods aeratable by the gas. The apparatus comprises a grating with through-flow apertures for a partial stream of the gas, which are so directed that this partial stream flows substantially horizontally from the outside and inwardly towards the middle of the bed, and a further gas inlet in the middle of the grating for introducing a second partial stream of the gas from below and upwardly in the bed.

The basic design for the apparatus is previously known, e.g. through the Swedish patent specification 226 042.

In spite of there being the need within many areas of technology for intermingling bulk goods with a dust-carrying gas for processing either one of them, apparatus of the type discussed has not been previously used for such purposes, inter alia because of the propensity of the grating through-flow apertures to choke up, and because of heavy wear on the grating from the supply of dust-loaded gas through these slit-like apertures. The advantages have obviously not been appreciated which a solution of this wear and choking problem would cause by making possible further developed embodiments, reliable from the point of view of function and extremely simple from that of manufacture.

The object of the invention is to provide an apparatus of the kind just discussed, which is so improved that it can work with dust-carrying gas without the risk of severe wear or being choked up. The intended object is achieved by making the apparatus with the characterizing features disclosed in the following main claim.

Two embodiments of the invention are described in detail in the following while referring to the appended drawings.

FIG. 1 schematically shows a vertical section through an apparatus according to the invention, and in front view an afterseparator arranged obliquely behind it.

FIG. 2 shows in the same way a somewhat modified embodiment of the apparatus.

Both the shown embodiments of the apparatus comprise a casing 1 in which a bowl-shaped grating 2 is arranged so that it separates the space inside the casing in an upper portion, constituting an aerating chamber 3 and a lower portion which, inter alia, contains a distribution chamber 4 for gas to the grating 2. The gas comes into the distribution chamber through an opening 5 and is distributed to a plurality of through-flow apertures 6 in the grating, the apertures being so disposed that the gas through them flows horizontally inwardly towards the middle of the aerating bed situated on the grating. The distribution chamber 4 is perforated by a central gas duct 7 leading a gas stream up into the bed from below. More accurately, this duct opens out into a gas inlet 8 through the centre of the grating 2 for blowing a vertically upwardly directed stream of gas into the aerating chamber 3 so that the circulatory movement in it is reinforced.

At its upper end, the aerating chamber 3 has an outlet opening 9 for gas which has been processed, or has been used for processing the bulk goods supplied to the bed.

The bulk goods is supplied to the aerating chamber 3 via a sluice 10 in an inlet duct 11 opening out into the upper portion of the chamber. The bulk goods used for processing the gas or being processed by it is emptied via a discharge hopper 12, a discharge duct 13 and a sluice 14.

According to the invention there is a dust separator 15 arranged for scrubbing the partial gas stream to the grating 2, whereas the gas inlet 8 at the centre of the grating is connected for feeding with a partial stream of the gas which is more rich in dust.

In the embodiment according to FIG. 1, two parallel partial streams are taken from a source not shown, e.g. a flue, and are ducted via separate passages to the aerating bed. One partial stream is thereby led in a duct 16 from the gas source to the separator 15 which discharges the scrubbed stream through the previously-mentioned opening 5 to the distribution chamber 4, whereby this flow is supplied to the bed through the through-flow apertures 6 of the grating 2. The other partial flow is taken through a duct 17 from the gas source into the duct 7 whereby this dust-charged stream is supplied to the bed via the gas inlet 8 at the centre of the grating. The flow rate of the partial stream in the gas inlet 8 and in the central gas duct 7, connected from below to the gas inlet 8, is lower than the falling speed of undesirable constituents assumed to be present in the bulk goods, so that these constituents fall down through the gas inlet 8 and the central gas duct 7. In the dust separator, the central gas duct merges into a duct portion which is taken outside the separator and in its lowest part is provided with an emptiable collecting hopper 18 for accommodating said undesirable constituents.

The material collected in the dust separator 15 is discharged by means of a sluice apparatus 19. The gas from the aerating chamber 3 is taken from the outlet opening 9 through a duct 20 to an after-separator 21, there being a fan (unillustrated) connected to the scrubbed gas outlet 22 thereof, for maintaining the gas flow through the apparatus from the ducts 16 and 17 from the gas source. Dust separated in the after-separator 21 is discharged by means of a sluice apparatus 23.

The main fields of use for the device shown in FIG. 1 is in processing of bulk goods with gas, and processing gas with bulk goods.

The first field of use may relate to drying the bulk goods by means of dust-carrying flue gas, while simultaneously separating heavy impurities from the bulk goods. A partial stream of the flue gas is taken through the duct 17 into the central gas duct 7, without any scrubbing at all, and is supplied to the aerating bed through the gas inlet 8 in the middle of the grating 2. A second partial stream of the flue gas is taken through the duct 16 to the separator 15 and is scrubbed before it is taken via the opening 5 and distribution chamber 4 past the through-flow slits 6 of the grating 2 and into the aerating bed. The bulk goods, which is assumed to be dried for further use as fuel, is supplied through the sluice 10 and is, in the aerating chamber 3, relieved of impurities having high falling speed, such that these fall down in the central duct 7, while on the other hand the bulk goods is supplied with combustible particles from the flue gas and is taken out together with these through the sluice 14. It is primarily a question of small-sized particles which adhere to the surface of the drying material resulting from the good contact between the drying material and the flue gas in the aerating bed. The flue gas, which has been scrubbed to a certain extent, is extracted through the opening 9, the duct 20 and the after-separator 21 for further scrubbing before it departs from the installation. Dust discharged through the sluices 19 and 23 can possibly be added to the bulk goods discharged through the sluice 14, outside the apparatus shown.

The second field of use may relate to scrubbing flue gas by providing a reaction with bulk goods supplied in the form of powder. The flue gas is supplied completely in compliance with what has just been described with regard to the first field of use. The bulk goods is supplied either through the sluice 10 or through the duct 7, 17 which can be provided with apparatus for feeding the bulk goods into the partial stream of flue gas flowing through this duct. Gas and dust are taken out in the same way as already described.

The embodiment shown in FIG. 2 distinguishes from that in FIG. 1 only in relation to the ducts for providing gas to the apparatus. The entire gas stream to the apparatus is supplied here through the duct 16 to the separator 15, which in this case as well has its scrubbed gas outlet connected to the inlet opening 5 of the distribution chamber 4. However, the gas inlet 8 at the centre of the grating 2 has its central duct 7 connected to the concentrating zone 24 of the dust separator 15 by means of a pipe 25. The gas stream which is sucked into the aerating chamber 3 from the concentration zone has a flow rate in the gas inlet 8 and the duct 7, 25 which is higher than the falling speed of at least a considerable portion of such dust particles which have been collected in the concentrating zone, whereby such particles are transported by the gas stream to the bed.

The dust separator 15 is situated under the grating 2 and the partial gas stream to the bed through the gas inlet 8 has a flow speed in both this inlet and the duct 7, 25 which is lower than the falling speed of undesired constituents of the bulk goods, so that these constituents fall through the connecting duct down into the concentrating zone 24 of the dust separator 15, but naturally higher than the falling speed of the desired goods, so that the cascade effect in the aerating bed is maintained. As may be seen from the figure, the dust separator 25 is actually a cyclone which has the connecting duct 7, 25 located at its central axis. The lower open end of the connecting duct is situated in the area of the cyclone vertex. The cyclone and the casing 1 are thereby built together into a simple and compact unit, whereby the distribution chamber 4 projects into the cyclone, and the inlet opening 5 of the former becomes the scrubbed gas outlet of the cyclone.

The embodiment shown in FIG. 2 is also suitable for both the fields of use set forth for the apparatus according to FIG. 1, but is particularly suitable for the one first mentioned.

In drying bulk goods by means of dust-carrying flue gas while simultaneously separating heavy impurities out of the bulk goods, the flue gas stream is supplied solely through the duct 16 and thus in its entirety to the separator 15. The gas stream is divided into two partial streams in the separator. One stream is scrubbed and departs through the opening 5 to the distribution chamber 4 and further to the aerating bed via the through-flow slits 6 of the grating 2. The other partial stream is taken out dust-enriched in the concentrating zone 24 of the separator and is passed to the aerating bed via the duct 25, 7 and inlet opening 8 in the middle of the grating 2. The bulk goods is fed in via the sluice 10, relieved of heavy impurities and enriched with dust in the same way as has been described before, but considerably larger amounts of dust are supplied to the aerating bed and accompany the drying material, while mainly heavy impurities sieved out of the drying material in the aerating chamber 3 are fed out through the sluice 19. In this case as well, the dried material is taken out through the sluice 14 and the flue gas departs via the duct 20 to the after-separator 21 for further scrubbing.

The gas inlet opening 8 in the middle of the grating 2 is shown as the opening of a cylindrical tube, but can consist of a truncated conical nozzle with a through-flow cross-section diminishing in the direction of flow, or by an orifice plate causing contraction of the gas jet going to the bed. The dust separator 15 has been shown and described as a cyclone, but can also be some other kind of separator, e.g. a compact cell filter. Neither in these nor other respects is the invention thus limited to the shown embodiments, but can be varied within the scope of the claims.

I claim:

1. An apparatus adapted for intermingling dust-carrying gas and bulk goods for treating either one of them, e.g. drying the bulk goods or scrubbing the gas, in a bed of the bulk goods aerated by the gas and comprising a grating (2) with through-flow openings (6) for a first partial stream of the gas, an aerating bed operatively associated with said grating, said openings being so directed that this first partial stream flows substantially horizontally from the outside and inwardly towards the middle of said bed, a further gas inlet (8) in substantially the center of the grating (2), a communicating duct (7) leading to said inlet (8) for introducing a second partial stream of the gas from below and upwardly in said bed, and a cyclone dust separator (15) having an output defined by a truncated element connected to the wall of said cyclone separator and in communication with said grating openings (6) and an input in communication with a gas supply source providing said first partial stream for cleaning the first partial stream before it is supplied to said through-flow openings (6) of said grating (2), said duct (7) extending through said truncated element, both partial streams of the gas being received from a common gas supply source so that the second partial stream is supplied to said grating more rich in dust than the first partial stream.

2. Apparatus as claimed in claim 1, wherein the flow speed of the second partial stream in said gas inlet (8) and in said communicating duct (7) connecting to it from below is lower than the falling speed of undesirable constituents in the bulk goods, so that these constituents fall down through said communicating duct (7) into a collecting hopper (18) arranged in connection with said communicating duct (7).

3. An apparatus adapted for intermingling dust-carrying gas and bulk goods for treating either one of them, e.g. drying the bulk goods or cleaning the gas, in a bed of the bulk goods aerated by the gas and comprising a grating (2) with through-flow openings (6) for a first partial stream of the gas, an aerating bed operatively associated with said grating, said openings being so directed that this first partial stream flows substantially horizontally from the outside and inwardly towards the middle of said bed, a further gas inlet (8) substantially in the center of the grating (2), a communicating duct (7, 25) leading to said inlet for introducing a second partial stream of the gas frow below and upwardly in said bed, and a cyclone dust separator (15) arranged under said grating (2) having an output defined by a truncated element connected to the wall of said cyclone separator and in communication with said grating openings (6) for cleaning the first partial stream before it is supplied to said through-flow openings (6) of said grating (2), said gas inlet (8) being connected by said communicating duct (7, 25) extending through said truncated element to a concentrating zone (24) in said dust separator (15) so that the second partial stream is supplied to said grating more rich in dust than the first partial stream.

4. An apparatus as claimed in claim 1, wherein the flow speed of the second partial stream in said gas inlet (8) in the middle of said grating (2) and in said communicating duct (7, 25) is greater than the falling speed of at least a considerable portion of such dust particles which have been collected in said concentrating zone (24) of said dust separator (15), so that such particles are transported with the partial stream to said bed, but lower than the falling speed of undesirable constituents of the bulk goods, so that these constituents fall through said communicating duct (7, 25) down into said concentrating zone (24) of said dust separator (15).

5. An apparatus as claimed in claim 3, wherein said cyclone dust separator (15) has said communicating duct (7, 25) located at its central axis, the lower end of said communicating duct (7, 25) being situated in the area of the cyclone vertex, which constitutes said concentrating zone (24).

* * * * *

UNITED STATES PATENT AND TRADEMARK OFFICE
CERTIFICATE OF CORRECTION

PATENT NO. : 4,076,509
DATED : February 28, 1978
INVENTOR(S) : Bo Christer Ferm

It is certified that error appears in the above-identified patent and that said Letters Patent are hereby corrected as shown below:

Claim 3, line 13, change "frow" to --from--

Signed and Sealed this

Twenty-seventh Day of June 1978

[SEAL]

Attest:

RUTH C. MASON
Attesting Officer

DONALD W. BANNER
Commissioner of Patents and Trademarks